(12) United States Patent
Choi

(10) Patent No.: US 7,532,293 B2
(45) Date of Patent: May 12, 2009

(54) IN PLANE SWITCHING LCD WITH ALTERNATING COMMON AND PIXEL ELECTRODES HAVING POLYGONAL LATTICE SHAPES

(75) Inventor: Sang-Ho Choi, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 390 days.

(21) Appl. No.: 11/226,275

(22) Filed: Sep. 15, 2005

(65) Prior Publication Data

US 2006/0055862 A1    Mar. 16, 2006

(30) Foreign Application Priority Data

Sep. 16, 2004    (KR) ...................... 10-2004-0074164

(51) Int. Cl.
*G02F 1/1343* (2006.01)
(52) U.S. Cl. ...................................... 349/141; 349/146
(58) Field of Classification Search .......... 349/139–146
See application file for complete search history.

(56) References Cited

U.S. PATENT DOCUMENTS

2002/0018166 A1* 2/2002 Matsumoto et al. ......... 349/141
2002/0131006 A1* 9/2002 Yang .......................... 349/141
2003/0133067 A1* 7/2003 Park et al. .................... 349/141
2004/0057003 A1* 3/2004 Yoo et al. .................... 349/141
2005/0151910 A1* 7/2005 Park et al. .................... 349/139
2005/0237465 A1* 10/2005 Lu et al. ...................... 349/141

* cited by examiner

*Primary Examiner*—Andrew Schechter
*Assistant Examiner*—Jessica M Merlin
(74) *Attorney, Agent, or Firm*—Morgan Lewis & Bockius LLP

(57) ABSTRACT

An array substrate for a liquid crystal display device includes a substrate, a gate line and a data line disposed on the substrate, a pixel electrode, and a common electrode. The data line crosses the gate line to define a pixel region. The pixel electrode is disposed on the substrate in the pixel region having a polygonal lattice shape such that a unit lattice of the pixel electrode has an inner angle greater than 90°. The common electrode is disposed on the substrate in the pixel region alternating with the pixel electrode and having a polygonal lattice shape such that a unit lattice of the common electrode has an inner angle greater than 90°.

29 Claims, 7 Drawing Sheets

IN PLANE SWITCHING LCD WITH ALTERNATING COMMON AND PIXEL ELECTRODES HAVING POLYGONAL LATTICE SHAPES

This application claims the benefit of Korean Patent Application No. 2004-0074164, filed on Sep. 16, 2004, which is hereby incorporated by reference.

BACKGROUND OF THE INVENTION

1. Field of the Invention

The present invention relates to a liquid crystal display (LCD) device, and more particularly, to an in-plane switching (IPS) mode liquid crystal display device and a method of fabricating the same.

2. Discussion of the Related Art

Flat panel display (FPD) devices having portability and low power consumption have been subject of recent research and development since the coming of the information age. Specifically, a liquid crystal display (LCD) device, a plasma display panel (PDP) device, an electroluminescent display (ELD) device and a vacuum fluorescent display (VFD) device have been developed as FPD devices. Among the various types of FPD devices, liquid crystal display (LCD) devices are widely used as monitors for notebook computers and desktop computers because of their high resolution, color quality and superior image movement.

In general, an LCD device includes a first substrate, a second substrate, and a liquid crystal layer between the first and second substrates. In an LCD device, an alignment direction of liquid crystal molecules in the liquid crystal layer is controlled by a vertical electric field generated between a pixel electrode on the first substrate and a common electrode on the second substrate, thereby displaying images. In an LCD device using a vertical electric field, however, a response speed of liquid crystal molecules and a viewing angle of the LCD device are relatively low.

To solve the above problems, an in-plane switching (IPS) mode LCD device has been suggested. In an IPS mode LCD device, a pixel electrode and a common electrode are formed on a single substrate and an alignment direction of liquid crystal molecules is controlled by a horizontal electric field generated between the pixel electrode and the common electrode. Accordingly, a response speed of the liquid crystal molecules and a viewing angle of the LCD device are improved.

FIG. 1 is a schematic plane view showing an array substrate of an IPS mode LCD device according to the related art. In FIG. 1, a gate line 111, a data line 141, a thin film transistor (TFT) "T," a common line 115, a pixel electrode 161, and a common electrode 117 are formed on a substrate. The gate line 111 crosses the data line 141 to define a pixel region "P" and the TFT "T" is connected to the gate line 111 and the data line 141. The TFT "T" includes a gate electrode 113 connected to the gate line 111, a semiconductor layer 131, a source electrode 143 connected to the data line 141, and a drain electrode 145 separated from the source electrode 143. The pixel electrode 161 is connected to the drain electrode 145.

The pixel electrode 161 and the common electrode 117 are parallel to and spaced apart from each other. When voltages are applied to the pixel electrode 161 and the common electrode 117, a horizontal electric field is generated between the pixel electrode 161 and the common electrode 117. Accordingly, a domain area "D" of liquid crystal molecules is defined by the pixel electrode 161. The liquid crystal molecules in the domain area "D" are re-aligned by the horizontal electric field generated between the pixel electrode 161 and the common electrode 117 when voltages are applied.

The pixel electrode 161 and the common electrode 117 are both formed to be parallel to the data line 141. Thus, the liquid crystal molecules in the domain areas "D" of the pixel region "P" are re-aligned along an equal alignment direction, and the domain areas "D" of the pixel region "P" have equal optical properties. As a result, the optical properties in the domain areas "D" are not compensated, and the LCD device has different contrast ratios at top, bottom, left, and right portions thereof. The difference in contrast ratios causes a reduction in viewing angle and a deviation of color coordinate at the top, bottom, left, and right portions. For example, deterioration—such as a yellow shift phenomenon and a blue shift phenomenon may be observed in an IPS mode LCD device according to the related art. Moreover, an additional common line 115 that does not function as a common electrode for generating a horizontal electric field is formed in the pixel region "P" reduces the aperture ratio of the IPS mode LCD device.

SUMMARY OF THE INVENTION

Accordingly, the present invention is directed to a liquid crystal display device and a method of fabricating the liquid crystal display device that substantially obviates one or more of the problems due to limitations and disadvantages of the related art.

An object of the present invention is to provide an in-plane switching mode liquid crystal display device having improved viewing angle and a contrast ratio uniformity and a method of fabricating such an IPS mode LCD device.

Another object of the present invention is to provide an in-plane switching mode liquid crystal display device having an improved aperture ratio.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device comprises a substrate; a gate line disposed on the substrate; a data line disposed on the substrate, the data line crossing the gate line to define a pixel region; a pixel electrode disposed on the substrate in the pixel region, the pixel region having a polygonal lattice shape such that a unit lattice of the pixel electrode has an inner angle greater than 90°; and a common electrode disposed on the substrate in the pixel region, the common electrode alternating with the pixel electrode and having a polygonal lattice shape such that a unit lattice of the common electrode has an inner angle greater than 90°.

In another aspect, a method of fabricating an array substrate for a liquid crystal display device comprises forming a gate line and a common electrode on a substrate, the common electrode having a polygonal lattice shape such that a unit lattice of the common electrode has an inner angle greater than 90°; forming a data line crossing the gate line to define a pixel region; and forming a pixel electrode in the pixel region with a polygonal lattice shape such that a unit lattice of the pixel electrode has an inner angle greater than 90°.

In another aspect, a liquid crystal display device comprises a first substrate; a second substrates facing and spaced apart from the first substrate; a gate line disposed on the first substrate; a data line disposed on the first substrate crossing the gate line to define a pixel region; a pixel electrode disposed in the pixel region having a polygonal lattice shape such that a unit lattice of the pixel electrode has an inner angle greater than 90°; a common electrode disposed in the pixel having a polygonal lattice shape such that a unit lattice of the common electrode having an inner angle greater than 90°, the common electrode alternating with the pixel electrode; and a liquid crystal layer disposed between the first and second substrates.

In another aspect, a liquid crystal display device comprises a first substrate; a second substrates facing and spaced apart from the first substrate; a gate line disposed on the first substrate; a data line disposed on the first substrate crossing the gate line to define a pixel region; a pixel electrode disposed in the pixel region having a polygonal lattice shape such that a unit lattice of the pixel electrode has more than four sides; a common electrode disposed in the pixel having a polygonal lattice shape such that a unit lattice has more than four sides, the common electrode alternating with the pixel electrode; and a liquid crystal layer disposed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used to refer to the same or similar parts.

Figure 1:
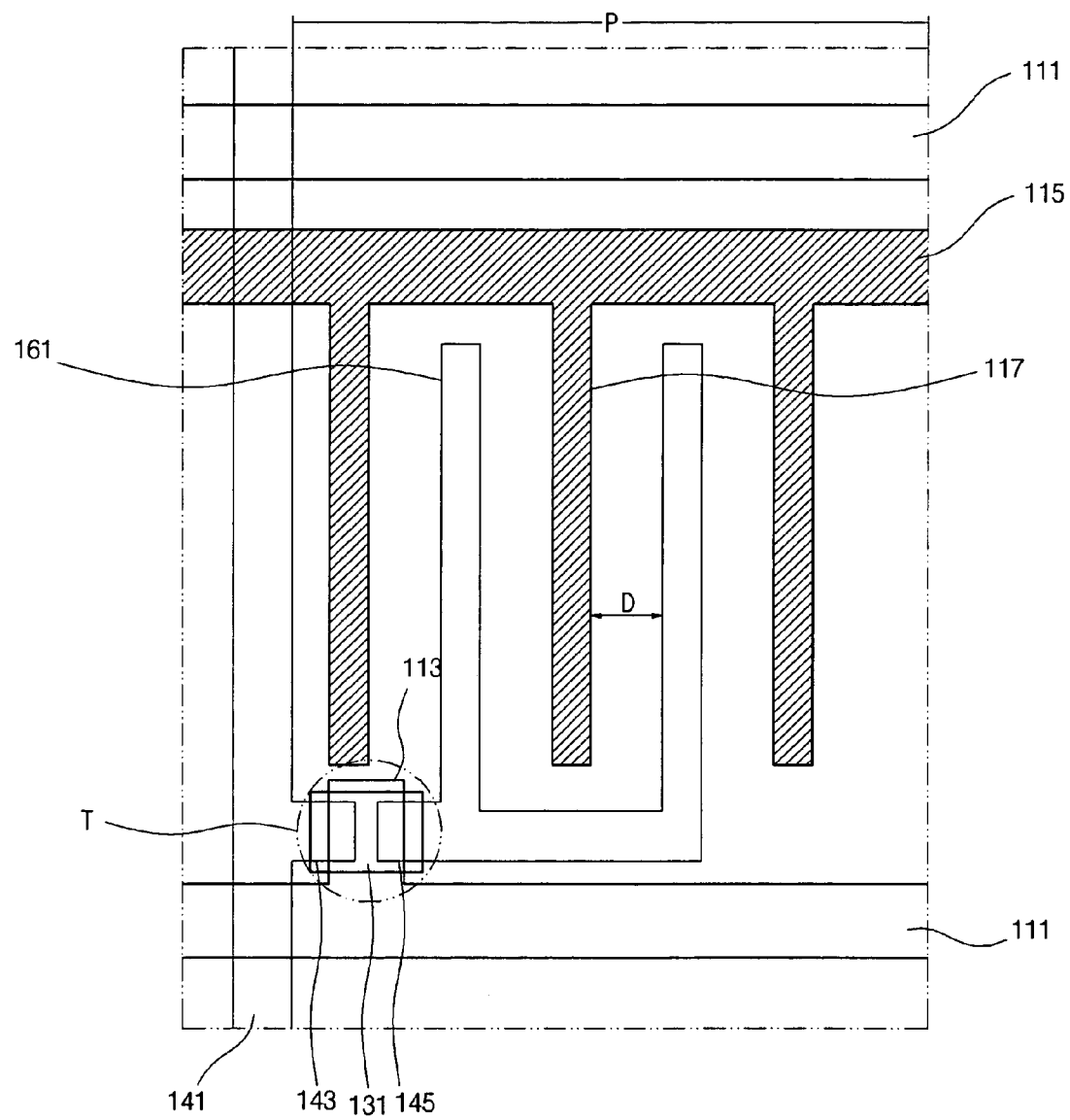
FIG. 1 is a schematic plane view showing an array substrate of an IPS mode LCD device according to the related art.
Figure 2:
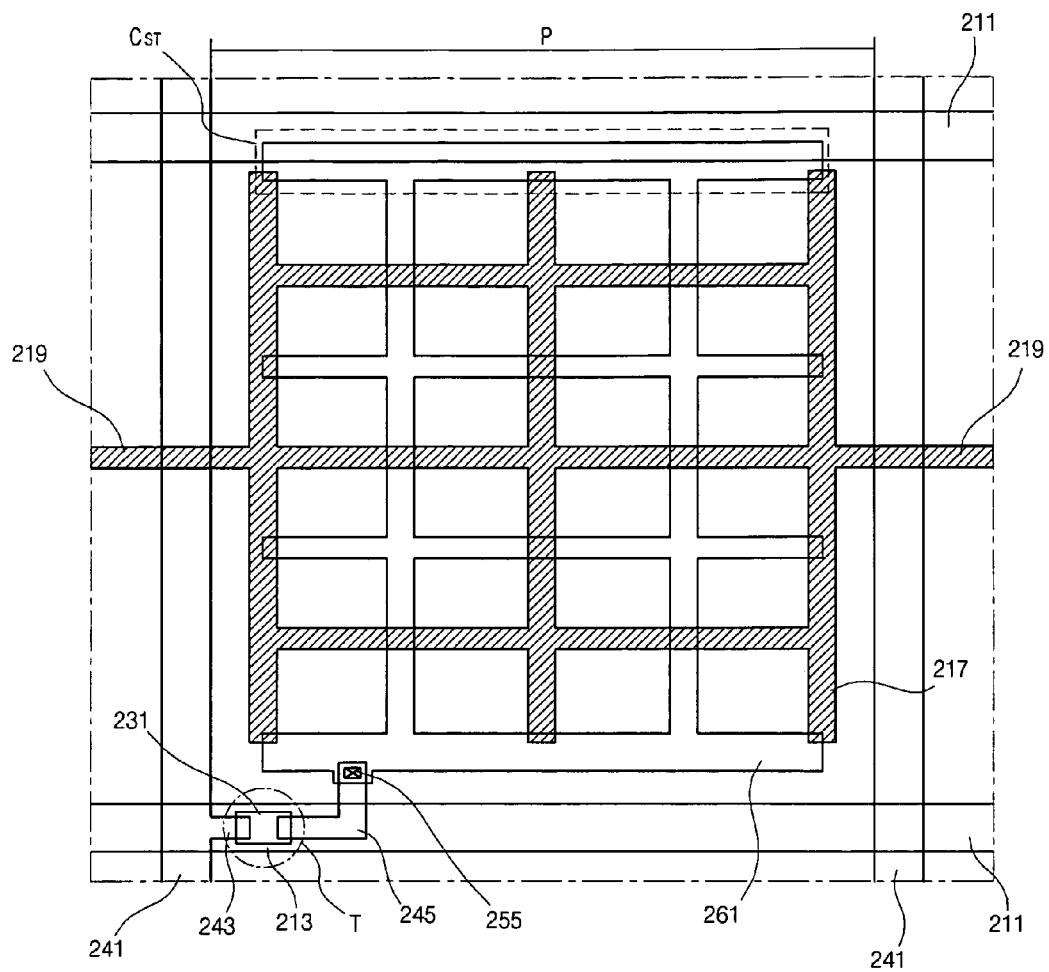
FIG. 2 is a schematic plane view showing an exemplary array substrate of an in-plane switching mode liquid crystal display device according to an exemplary embodiment of the present invention.
Figure 3:
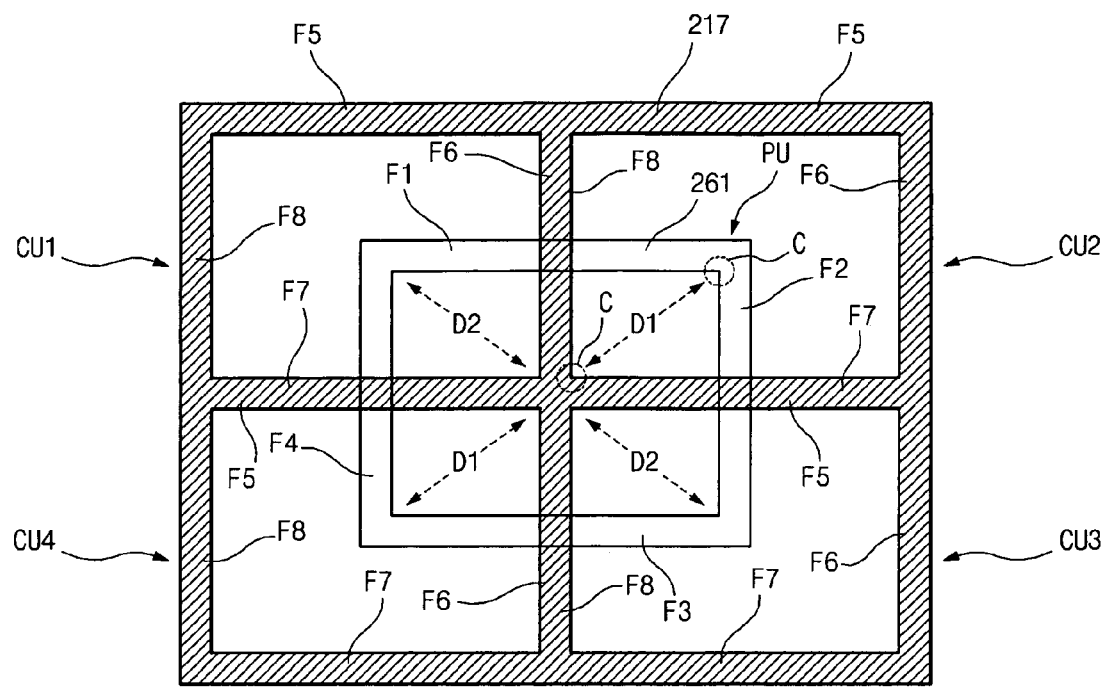
FIG. 3 is a schematic plane view showing a pixel electrode and a common electrode of an in-plane switching mode liquid crystal display device according to an exemplary embodiment of the present invention.
Figure 4:
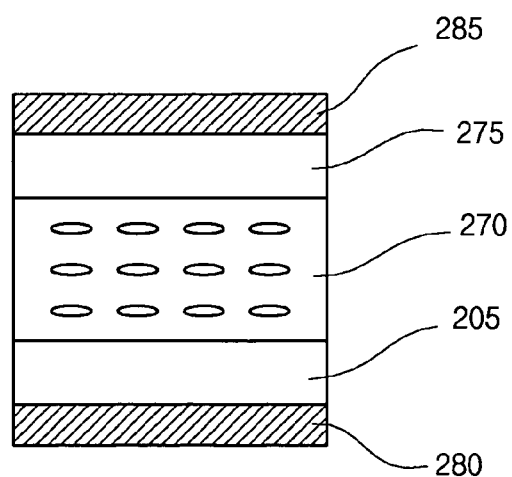
FIG. 4 is a schematic cross-sectional view showing an in-plane switching mode liquid crystal display device according to an exemplary embodiment of the present invention.
Figure 5:
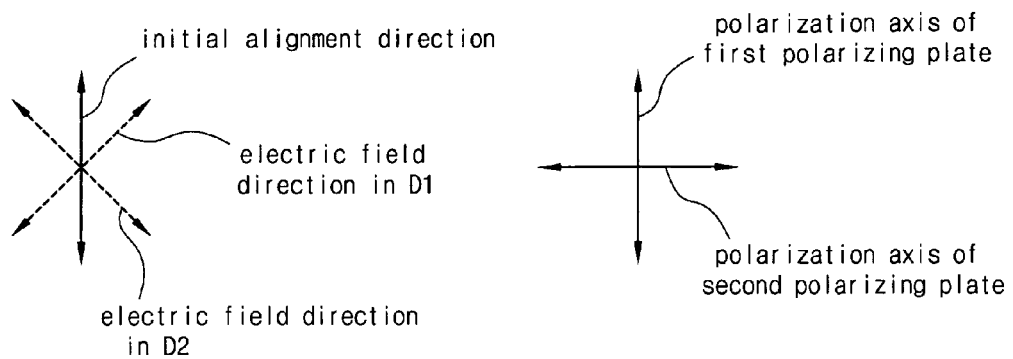
FIG. 5 is a schematic view showing an initial alignment direction of liquid crystal molecules and a polarization axis of an in-plane switching mode liquid crystal display device according to an exemplary embodiment of the present invention.

FIG. 2 is a schematic plane view showing an array substrate of an in-plane switching mode liquid crystal display device according to an exemplary embodiment of the present invention, and FIG. 3 is a schematic plane view showing a pixel electrode and a common electrode of an in-plane switching mode liquid crystal display device according to an exemplary embodiment of the present invention. Further, FIG. 4 is a schematic cross-sectional view showing an in-plane switching mode liquid crystal display device according to an exemplary embodiment of the present invention, and FIG. 5 is a schematic view showing an initial alignment direction of liquid crystal molecules and a polarization axis of an in-plane switching mode liquid crystal display device according to an exemplary embodiment of the present invention.

In FIGS. 2 to 5, an IPS mode LCD device includes a first substrate 205, a second substrate 275 facing the first substrate 205, a liquid crystal layer 270 between the first and second substrates 205 and 275, a first polarizing plate 280 on an outer surface of the first substrate 205 and a second polarizing plate 285 on an outer surface of the second substrate 275. A gate line 211, a data line 241, a thin film transistor (TFT) "T," a pixel electrode 261 and a common electrode 217 are formed on an inner surface of the first substrate 205. The gate line 211 crosses the data line 241 to define a pixel region "P" and the TFT "T" is connected to the gate line 211 and the data line 241. The TFT "T" includes a gate electrode 213 connected to the gate line 211, a semiconductor layer 231, a source electrode 243 connected to the data line 241 and a drain electrode 245 separated from the source electrode 243. A portion of the gate line 211 corresponding to the semiconductor layer 231 may be used as the gate electrode 213 to improve aperture ratio.

The pixel electrode 261 and the common electrode 217 are spaced apart from each other and generate a horizontal electric field when voltages are applied. The pixel electrode 261 is connected to the drain electrode 245 through a drain contact hole 255. In addition, the pixel electrode 261 may include a transparent conductive material such as indium-tin-oxide (ITO) and indium-zinc-oxide (IZO). The pixel electrode 261 may be formed of the same material as the drain electrode 245 at the same time. A portion of the pixel electrode 261 and a portion of the previous gate line 211 overlapping each other constitute a storage capacitor "Cst" with a gate insulating layer (not shown) and a passivation layer (not shown) interposed therebetween. The common electrode 217 may be formed of the same material as the gate line 211 at the same time. Since the common electrodes 217 in the adjacent pixel regions "P" are connected to each other through a connection electrode 219, a common voltage is applied to the common electrode 217 without using an additional common line that is not used for generating a horizontal electric field in a pixel region "P." Accordingly, an aperture ratio is improved.

The pixel electrode 261 and the common electrode 217 have a rectangular lattice shape where each edge portion "C" of the rectangular shape has an inner angle of about 90°. Specifically, a pixel unit lattice "PU" of the pixel electrode 261 alternates with a common unit lattice "CU" of the common electrode 217. As shown in FIG. 3, a single pixel unit lattice "PU" overlaps first, second, third and fourth common unit lattice "CU1," "CU2," "CU3" and "CU4." Each pixel unit lattice "PU" includes first, second, third and fourth sides "F1," "F2," "F3" and "F4" and each common unit lattice "CU" includes fifth, sixth, seventh and eighth sides "F5," "F6," "F7" and "F8." Accordingly, the first side "F1" of the single pixel unit lattice "PU" crosses the sixth side "F6" of the first common unit lattice "CU1" and the eighth side "F8" of the second common unit lattice "CU2," and the second side "F2" of the single pixel unit lattice "PU" crosses the seventh side "F7" of the second common unit lattice "CU2" and the fifth side "F5" of the third common unit lattice "CU3." Similarly, the third side "F3" of the single pixel unit lattice "PU" crosses the eighth side "F8" of the third common unit lattice "CU3" and the sixth side "F6" of the fourth common unit lattice "CU4," and the fourth side "F4" of the single pixel unit lattice "PU" crosses the fifth side "F5" of the fourth common unit lattice "CU4" and the seventh side "F7" of the first common unit lattice "CU1." As a result, two sides of each pixel unit lattice "PU" cross two sides of each common unit lattice "CU."

First and second domain areas "D1" and "D2," where alignment directions of liquid crystal molecules are different from each other, are defined by crossing of the pixel electrode 261 and the common electrode 217. The first and second domain areas "D1" and "D2" are alternately disposed in each pixel unit lattice "PU" and each common unit lattice "CU." Accordingly, the first and second domain areas "D1" and "D2" are alternately disposed along a direction parallel to the gate line 211 and a direction parallel to the data line 241. As shown in FIG. 3, horizontal electric fields (directions of dotted line) generated in the first and second domain areas "D1" and "D2" have angles of about 45° and about 135°, respectively, with respect to the gate line 211. Since the liquid crystal molecules are re-aligned along the horizontal electric field, the alignment direction of liquid crystal molecules in the first domain area "D1" is different from the alignment direction of liquid crystal molecules in the second domain area "D2."

As shown in FIG. 5, liquid crystal molecules may have an initial alignment direction parallel to the data line 241 before the horizontal electric field is applied. For example, the initial alignment direction may have an angle of about 90° with respect to the gate line 211. In addition, polarization axes of the first and second polarizing plates 280 and 285 cross each other and are substantially perpendicular to each other, and the polarization axis of the first polarizing plate 280 may be parallel to the initial alignment direction of the liquid crystal molecules. Since the horizontal electric fields generated in the first and second domain areas "D1" and "D2" are substantially perpendicular to each other, an optical property is compensated. Accordingly, a viewing angle is improved, and a deviation in a color coordinate is reduced. Thus, color shift is prevented.

However, since each edge portion "C" of the rectangular shape of the pixel electrode 261 and the common electrode 217 has an inner angle of about 90°, liquid crystal molecules in the edge portions "C" of each common unit lattice "CU" and each pixel unit lattice "PU" may not be re-aligned along a diagonal direction making an angle of about 45° or about 90° with respect to the gate line 211. In a central portion of each common unit lattice "CU" and each pixel unit lattice "PU," the horizontal electric field is generated along a diagonal direction of the rectangular shape. In the edge portions "C" of each common unit lattice "CU" and in the edge portions of each pixel unit lattice "PU," an equipotential line is formed along the unit lattice, and the generated horizontal electric field is distorted. Accordingly, the liquid crystal molecules may not be aligned along the required diagonal direction due to the distorted horizontal electric field. The liquid crystal molecules not aligned along the required diagonal direction cause reductions in a transmittance and an aperture ratio of the IPS mode LCD device.

To prevent the above possible drawbacks, an IPS mode LCD device where edge portions of unit lattice have an obtuse inner angle greater than a right angle is suggested in another exemplary embodiment of the present invention.

Figure 6:
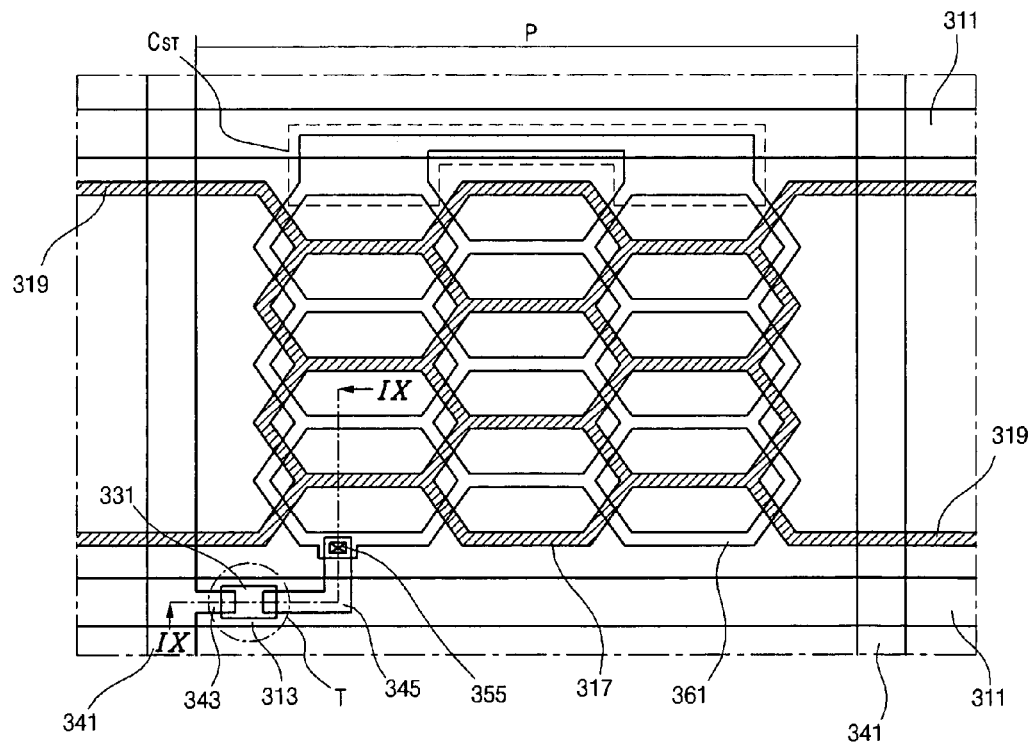
FIG. 6 is a schematic plane view showing an array substrate of an in-plane switching mode liquid crystal display device according to another exemplary embodiment of the present invention.
Figure 7:
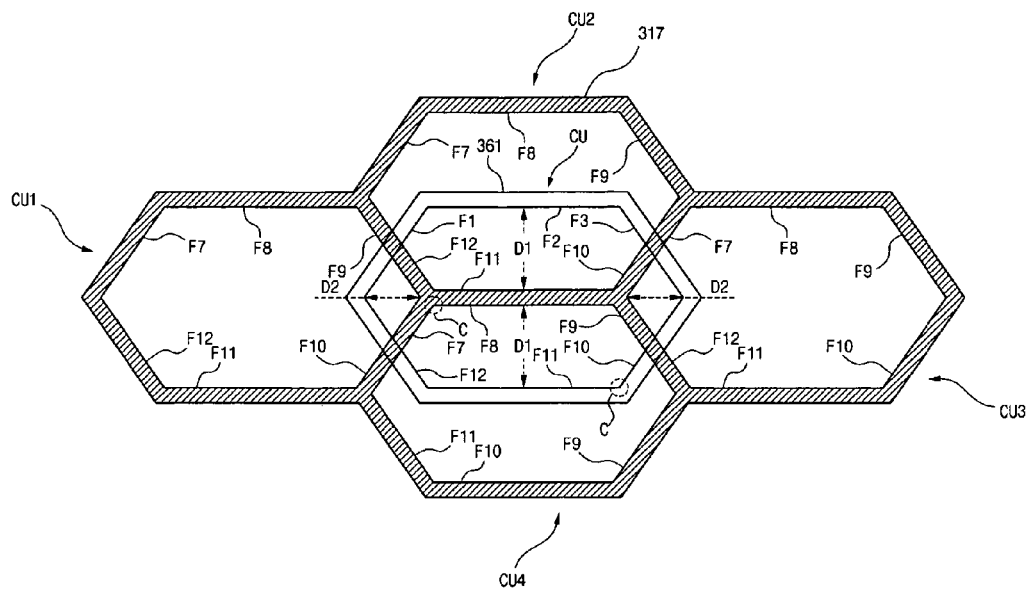
FIG. 7 is a schematic plane view showing a pixel electrode and a common electrode of an in-plane switching mode liquid crystal display device according to another exemplary embodiment of the present invention.
Figure 8:
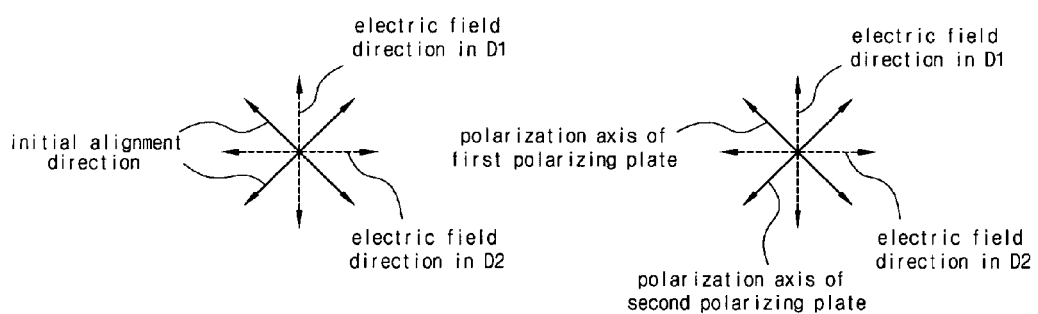
FIG. 8 is a schematic view showing an initial alignment direction of liquid crystal molecules and a polarization axis of an in-plane switching mode liquid crystal display device according to another exemplary embodiment of the present invention.

FIG. 6 is a schematic plane view showing an array substrate of an in-plane switching mode liquid crystal display device according to another exemplary embodiment of the present invention, and FIG. 7 is a schematic plane view showing a pixel electrode and a common electrode of an in-plane switching mode liquid crystal display device according to another exemplary embodiment of the present invention. Further, FIG. 8 is a schematic view showing an initial alignment direction of liquid crystal molecules and a polarization axis of an in-plane switching mode liquid crystal display device according to another exemplary embodiment of the present invention.

In FIG. 6, an array substrate of an IPS mode LCD device includes a gate line 311, a data line 341, a thin film transistor (TFT) "T," a pixel electrode 361 and a common electrode 317. The gate line 311 crosses the data line 341 to define a pixel region "P" and the TFT "T" is connected to the gate line 311 and the data line 341. The TFT "T" includes a gate electrode 313 connected to the gate line 311, a semiconductor layer 331, a source electrode 343 connected to the data line 341, and a drain electrode 345 separated from the source electrode 343. A portion of the gate line 311 corresponding to the semiconductor layer 331 may function as the gate electrode 313 to improve an aperture ratio.

The pixel electrode 361 and the common electrode 317 are spaced apart from each other and generate a horizontal electric field when voltages are applied. The pixel electrode 361 is connected to the drain electrode 345 through a drain contact hole 355. In addition, the pixel electrode 361 may include a transparent conductive material such as indium-tin-oxide (ITO) and indium-zinc-oxide (IZO). In another exemplary embodiment, the pixel electrode 361 may be formed of the same material as the drain electrode 345 at the same time. A portion of the pixel electrode 361 and a portion of the previous gate line 311 overlapping each other constitute a storage capacitor "Cst" with a gate insulating layer (not shown) and a passivation layer (not shown) interposed therebetween. The common electrode 317 may be formed of the same material as the gate line 311 at the same time. Since the common electrodes 317 in the adjacent pixel regions "P" is connected to each other through a connection electrode 319, a common voltage is applied to the common electrode 317 without using an additional common line that is not used for generating a horizontal electric field in a pixel region "P." Accordingly, aperture ratio is improved.

The pixel electrode 361 and the common electrode 317 have a hexagonal lattice shape. Specifically, each of a pixel unit lattice "PU" of the pixel electrode 361 and a common unit lattice "CU" of the common electrode 317 have a hexagonal shape, and the pixel unit lattice "PU" alternates with the common unit lattice "CU." In addition, all inner angles of the pixel unit lattice "PU" and the common unit lattice "CU" are obtuse angles greater than about 90°.

As shown in FIG. 7, a single pixel unit lattice "PU" overlaps first, second, third and fourth common unit lattice "CU1," "CU2," "CU3" and "CU4." Each pixel unit lattice "PU" includes first, second, third, fourth, fifth and sixth sides "F1," "F2," "F3," "F4," "F5" and "F6" and each common unit lattice "CU" includes seventh, eighth, ninth, tenth, eleventh and twelfth sides "F7," "F8," "F9," "F10," "F11" and "F12." Accordingly, the first side "F1" of the single pixel unit lattice "PU" crosses the ninth side "F9" of the first common unit lattice "CU1" and the twelfth side "F12" of the second common unit lattice "CU2," and the third side "F3" of the single pixel unit lattice "PU" crosses the tenth side "F10" of the second common unit lattice "CU2" and the seventh side "F7" of the third common unit lattice "CU3." Similarly, the fourth side "F4" of the single pixel unit lattice "PU" crosses the twelfth side "F12" of the third common unit lattice "CU3" and the ninth side "F9" of the fourth common unit lattice "CU4," and the sixth side "F6" of the single pixel unit lattice "PU" crosses the seventh side "F7" of the fourth common unit lattice "CU4" and the tenth side "F10" of the first common unit lattice "CU1." The second and fifth sides "F2" and "F5" of the single pixel unit lattice "PU" do not cross any side of the first, second, third and fourth common unit lattice "CU1," "CU2," "CU3" and "CU4" but are disposed parallel to the eighth and eleventh sides "F8" and "F11" of the second and fourth common unit lattice "CU2" and "CU4."

Here, the ninth side "F9" of the first common unit lattice "CU1" coincides with the twelfth side "F12" of the second common unit lattice "CU2," and the tenth side "F10" of the first common unit lattice "CU1" coincides with the seventh side "F7" of the fourth common unit lattice "CU4." Similarly, the seventh side "F7" of the third common unit lattice "CU3" coincides with the tenth side "F10" of the second common unit lattice "CU2," and the twelfth side "F12" of the third common unit lattice "CU3" coincides with the ninth side "F9" of the fourth common unit lattice "CU4." In addition, the eleventh side "F11" of the second common unit lattice "CU2" coincides with the eighth side "F8" of the fourth common unit lattice "CU4." As a result, two sides of each pixel unit lattice "PU" cross two sides of each surrounding common unit lattice "CU."

A first domain area "D1" having a hexagonal shape and a second domain area "D2" having a lozenge shape, where alignment directions of liquid crystal molecules are different from each other, are defined by crossing of the pixel electrode 361 and the common electrode 317. The first and second domain areas "D1" and "D2" are alternately disposed in each pixel unit lattice "PU" and each common unit lattice "CU." Accordingly, the first and second domain areas "D1" and "D2" are alternately disposed along a direction parallel to the gate line 211 and a direction parallel to the data line 241. For example, each of the pixel unit lattice "PU" and the common unit lattice "CU" may include two first domain areas "D1" and two second domain areas "D2." In each of the pixel unit lattice "PU" and the common unit lattice "CU," the two first domain areas "D1" are disposed to adjoin each other and the two second domain areas are disposed to be separated from each other. In the first domain area "D1," each of the pixel electrode 361 and the common electrode 317 has two edge portions "C" where an equipotential line is formed along each of the pixel electrode 361 and the common electrode 317. In the second domain area "D2," each of the pixel electrode 361 and the common electrode 317 has one edge portion "C" where an equipotential line is formed along each of the pixel electrode 361 and the common electrode 317. The edge portions "C" face and are spaced apart from each other in each pixel unit lattice "PU" and each common unit lattice "CU." In addition, each of the edge portions "C" in the first and second domain areas "D1" and "D2" has an obtuse inner angle greater than about 90°.

Horizontal electric fields (directions of dotted line) generated in the first and second domain areas "D1" and "D2" have angles of about 90° and about 0°, respectively, with respect to the gate line 311. Accordingly, the horizontal electric field generated in the first domain area "D1" is parallel to the data line 341, and the horizontal electric field generated in the second domain area "D2" is parallel to the gate line 311. The horizontal electric field generated in the first domain area "D1" is substantially perpendicular to the horizontal electric field generated in the second domain area "D2." Since the liquid crystal molecules are re-aligned along the horizontal electric field, the alignment direction of liquid crystal molecules in the first domain area "D1" is different from the alignment direction of liquid crystal molecules in the second domain area "D2."

As shown in FIG. 8, liquid crystal molecules may have an initial alignment direction between the horizontal electric fields generated in the first and second domain areas "D1" and "D2" before a voltage is applied. Accordingly, the initial alignment direction may be between the gate line 311 and the data line 341. For example, the initial alignment direction may have an angle of about 45° or about 135° with respect to the gate line 311. In addition, polarization axes of the first and second polarizing plates substantially perpendicularly cross each other, and the polarization axis of the first polarizing plate may parallel to the initial alignment direction of the liquid crystal molecules. Since the horizontal electric fields generated in the first and second domain areas "D1" and "D2" are substantially perpendicular to each other, an optical property is compensated. Accordingly, a viewing angle is improved, and a deviation in a color coordinate is reduced. Thus, colorshift is prevented. Moreover, since each of the edge portions "C" in the first and second domain areas "D1" and "D2" has an obtuse inner angle greater than about 90°, a distortion of the horizontal electric field is reduced. As a result, a transmittance and an aperture ratio are improved.

Figure 9A:
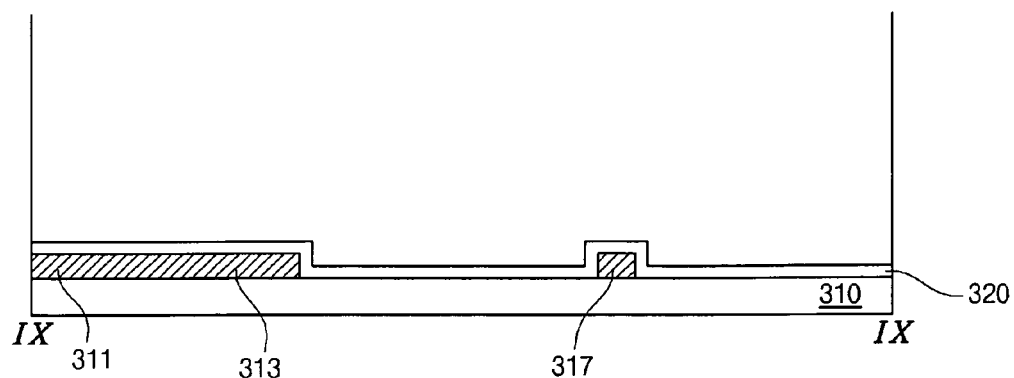
FIGS. 9A to 9C are schematic cross-sectional views taken along cross-sectional line "IX-IX" of FIG. 6 showing a fabricating process of an array substrate of an in-plane switching mode liquid crystal display device according to another exemplary embodiment of the present invention.
Figure 9B:
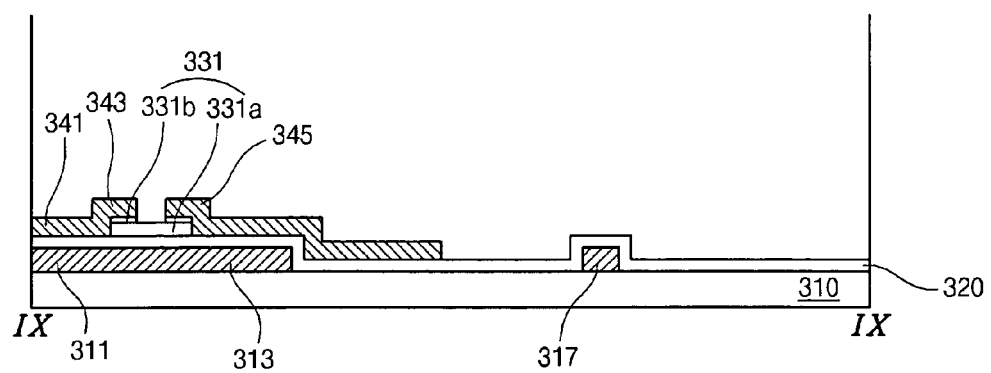
Figure 9C:
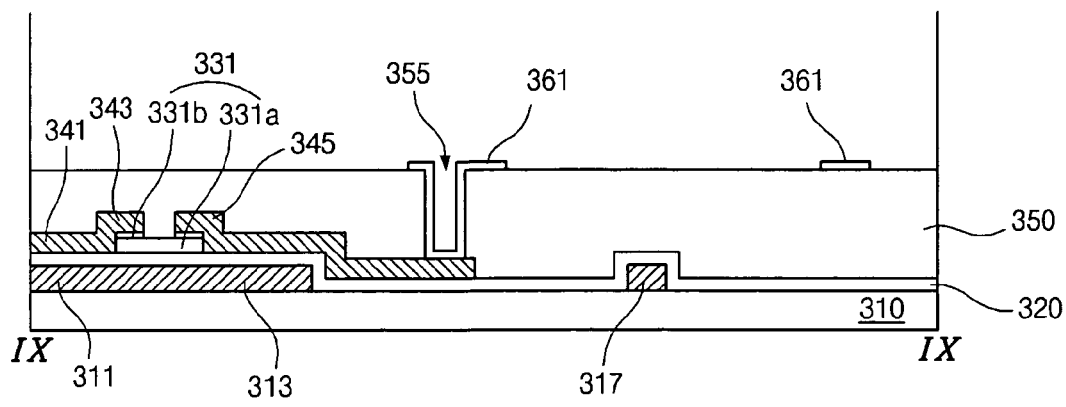

FIGS. 9A to 9C are schematic cross-sectional views, taken along cross-sectional line "IX-IX" of FIG. 6 showing a fabricating process of an array substrate of an in-plane switching mode liquid crystal display device according to another exemplary embodiment of the present invention.

In FIG. 9A, a gate line 311, a gate electrode 313, a common electrode 317 and a connection electrode 319 (shown in FIG. 6) are formed on a substrate 310 by depositing and patterning a first metal layer. The first metal layer may include one of copper (Cu), copper (Cu) alloy, aluminum (Al), aluminum (Al) alloy, chromium (Cr), molybdenum (Mo), tungsten (W) and tantalum (Ta). A gate insulating layer 320 is formed on the gate line 311, the gate electrode 313, the common electrode 317, and the connection electrode 319 (shown in FIG. 6). The gate insulating layer may include one of an inorganic insulating material, such as silicon oxide ($SiO_2$) and silicon nitride ($SiN_x$), and an organic insulating material, such as benzocyclobutene (BCB) and acrylic resin.

In FIG. 9B, a semiconductor layer 331 is formed on the gate insulating layer over the gate electrode 313. The semiconductor layer 331 may include an intrinsic amorphous silicon layer (a-Si) 331a and a doped amorphous silicon layer ($n^+$ a-Si) 331b. The intrinsic amorphous silicon layer 331a and the doped amorphous silicon layer 331b function as an active layer and an ohmic contact layer, respectively. The doped amorphous silicon layer 331b corresponding to the gate electrode 313 is removed in a subsequent process to expose a channel region of the intrinsic amorphous silicon layer 331a. A data line 341 is formed on the substrate 310, and source and drain electrodes 343 and 345 are formed on the semiconductor layer 331 by depositing and patterning a second metal layer. The second metal layer may include one of copper (Cu), copper (Cu) alloy, aluminum (Al), aluminum (Al) alloy, chromium (Cr), molybdenum (Mo), tungsten (W) and tantalum (Ta).

In FIG. 9C, a passivation layer 350 is formed on the data line 341, the source electrode 343 and the drain electrode 345. The passivation layer 350 has a drain contact hole 355 exposing the drain electrode 345. In addition, the passivation layer 350 may include one of inorganic insulating material, such as silicon oxide ($SiO_2$) and silicon nitride ($SiN_x$), and an organic insulating material, such as benzocyclobutene (BCB) and acrylic resin. A pixel electrode 361 is formed on the passivation layer 350 by depositing and patterning a transparent conductive material. The pixel electrode 361 is connected to the drain electrode 345 through the drain contact hole 355.

In an IPS mode LCD device as shown in FIGS. 6 to 8, the pixel electrode and the common electrode have a hexagonal shape having obtuse inner angles. In an IPS mode LCD device according to another embodiment, the pixel electrode and the common electrode may have polygonal shape where all inner angles are obtuse angles greater than 90°.

In an IPS mode LCD device according to the present invention, a pixel electrode and a common electrode having a polygonal lattice shape alternate with each other in a pixel region, and a plurality of domain areas where optical properties are different from each other are formed in the pixel region. Accordingly, the optical properties of the plurality of domain areas compensate each other. As a result, a viewing angle is improved and deterioration, such as a color shift, is reduced due to minimization of deviation in color coordinate. In addition, aperture ratio is improved due to omission of an additional common line that does not function as a common electrode for generating a horizontal electric field in the pixel region. Furthermore, since the polygonal lattice shape has obtuse inner angles, distortion of the horizontal electric field is reduced in edge portions of the polygonal lattice shape. Therefore, an aperture ratio is further improved.

It will be apparent to those skilled in the art that various modifications and variations can be made in the liquid crystal display device and method of fabricating a liquid crystal display device without departing from the spirit or scope of the invention. Thus, it is intended that the present invention cover the modifications and variations of this invention provided they come within the scope of the appended claims and their equivalents.

What is claimed is:

1. An array substrate for a liquid crystal display device, comprising:
   a substrate;
   a gate line disposed on the substrate;
   a data line disposed on the substrate, the data line crossing the gate line to define a pixel region;
   a pixel electrode disposed on the substrate in the pixel region, the pixel electrode having a polygonal lattice shape such that a unit lattice of the pixel electrode has all inner angles greater than 90°; and
   a common electrode disposed on the substrate in the pixel region, the common electrode alternating with the pixel electrode and having a polygonal lattice shape such that a unit lattice of the common electrode has all inner angles greater than 90°.

2. The array substrate according to claim 1, wherein the pixel electrode has a hexagonal lattice shape.

3. The array substrate according to claim 2, wherein the common electrode has a hexagonal lattice shape.

4. The array substrate according to claim 3, wherein the pixel electrode and the common electrode in the pixel region define a first domain area having a hexagonal shape and a second domain area having a lozenge shape, the first and second domain areas alternately disposed in the pixel region.

5. The array substrate according to claim 4, wherein an electric field generated in the first domain area is substantially perpendicular to an electric field generated in the second domain area.

6. The array substrate according to claim 4, wherein each unit lattice of the pixel electrode and each unit lattice of the common electrode includes two first domain areas separated from each other and two second domain areas adjoining each other.

7. The array substrate according to claim 6, wherein each of the pixel electrode and the common electrode defining one of the unit lattice of the pixel electrode and the unit lattice of the common electrode includes two edge portions, and each of the pixel electrode and the common electrode defining one of the unit lattice of the pixel electrode and the unit lattice of the common electrode includes one edge portion.

8. The array substrate according to claim 3, wherein the unit lattice of the pixel electrode includes first, second, third, fourth, fifth and sixth sides constituting a hexagonal shape, and the unit lattice of the common electrode includes seventh, eighth, ninth, tenth, eleventh and twelfth sides constituting a hexagonal shape, wherein the first and third sides cross the twelfth and tenth sides, respectively, the fourth and sixth sides cross the ninth and seventh sides, respectively, and the second and fifth sides are substantially parallel to the eleventh and eighth sides.

9. The array substrate according to claim 1, wherein the pixel electrode includes one of indium-tin-oxide (ITO) and indium-zinc-oxide (IZO).

10. The array substrate according to claim 1, further comprising a connection electrode connecting the common electrodes in the adjacent pixel regions.

11. The array substrate according to claim 1, wherein the common electrode is formed of the same deposition layer as the gate line.

12. A method of fabricating an array substrate for a liquid crystal display device, comprising:
   forming a gate line and a common electrode on a substrate, the common electrode having a polygonal lattice shape such that a unit lattice of the common electrode has all inner angles greater than 90°;
   forming a data line crossing the gate line to define a pixel region; and
   forming a pixel electrode in the pixel region with a polygonal lattice shape such that a unit lattice of the pixel electrode has all inner angles greater than 90°.

13. The method according to claim 12, wherein the pixel electrode has a hexagonal lattice shape.

14. The method according to claim 13, wherein the common electrode has a hexagonal lattice shape.

15. The method according to claim 14, wherein the pixel electrode and the common electrode in the pixel region define a first domain area having a hexagonal shape and a second domain area having a lozenge shape, the first and second domain areas alternately disposed in the pixel region.

16. The method according to claim 15, wherein an electric field generated in the first domain area is substantially perpendicular to an electric field generated in the second domain area.

17. The method according to claim 15, wherein each unit lattice of the pixel electrode and each unit lattice of the common electrode includes two first domain areas separated from each other and two second domain areas adjoining each other.

18. The method according to claim 17, wherein each of the pixel electrode and the common electrode defining one of the unit lattice of the pixel electrode and the unit lattice of the common electrode includes two edge portions, and each of the pixel electrode and the common electrode defining one of the unit lattice of the pixel electrode and the unit lattice of the common electrode includes one edge portion.

19. The method according to claim 14, wherein the unit lattice of the pixel electrode includes first, second, third, fourth, fifth and sixth sides constituting a hexagonal shape, and the unit lattice of the common electrode includes seventh, eighth, ninth, tenth, eleventh and twelfth sides constituting a hexagonal shape wherein the first and third sides cross the twelfth and tenth sides, respectively, the fourth and sixth sides cross the ninth and seventh sides, respectively, and the second and fifth sides are substantially parallel with the eleventh and eighth sides.

20. The method according to claim 12, wherein the pixel electrode includes one of indium-tin-oxide (ITO) and indium-zinc-oxide (IZO).

21. The method according to claim 12, further comprising forming a connection electrode connecting the common electrodes in the adjacent pixel regions.

22. A liquid crystal display device, comprising:
a first substrate;
a second substrate facing and spaced apart from the first substrate;
a gate line disposed on the first substrate;
a data line disposed on the first substrate crossing the gate line to define a pixel region;
a pixel electrode disposed in the pixel region having a polygonal lattice shape such that a unit lattice of the pixel electrode has all inner angles greater than 90°;
a common electrode disposed in the pixel region having a polygonal lattice shape such that a unit lattice of the common electrode having all inner angles greater than 90°, the common electrode alternating with the pixel electrode; and
a liquid crystal layer disposed between the first and second substrates.

23. The device according to claim 22, wherein the pixel electrode and the common electrode each have a hexagonal lattice shape.

24. The device according to claim 23, wherein the pixel electrode and the common electrode in the pixel region define a first domain area having a hexagonal shape and a second domain area having a lozenge shape, the first and second domain areas alternately disposed in the pixel region.

25. The device according to claim 24, wherein an electric field generated in the first domain area is substantially perpendicular to an electric field generated in the second domain area.

26. The device according to claim 24, wherein the liquid crystal layer has an initial alignment direction between the electric fields generated in the first and second domain areas.

27. The device according to claim 26, further comprising a first polarizing plate having a first polarization axis corresponding to the initial alignment direction and a second polarizing plate having a second polarization axis substantially perpendicular to the first polarization axis.

28. The device according to claim 27, wherein the first and second polarizing plates are disposed opposite outer surfaces of the device, respectively.

29. A liquid crystal display device, comprising:
a first substrate;
a second substrates facing and spaced apart from the first substrate;
a gate line disposed on the first substrate;
a data line disposed on the first substrate crossing the gate line to define a pixel region;
a pixel electrode disposed in the pixel region having a polygonal lattice shape such that a unit lattice of the pixel electrode has more than four sides;
a common electrode disposed in the pixel having a polygonal lattice shape such that a unit lattice of the common electrode has more than four sides, the common electrode alternating with the pixel electrode; and
a liquid crystal layer disposed between the first and second substrates,
wherein all inner angles of the unit lattice of the pixel electrode are greater than 90° and all inner angles of the unit lattice of the common electrode are greater than 90°.

* * * * *